United States Patent
Mace

(10) Patent No.: US 8,393,643 B1
(45) Date of Patent: Mar. 12, 2013

(54) PERIMETER PANEL SYSTEM FOR RECREATIONAL VEHICLE

(76) Inventor: Vikki Mace, Rodanthe, NC (US)

(*) Notice: Subject to any disclaimer, the term of this patent is extended or adjusted under 35 U.S.C. 154(b) by 275 days.

(21) Appl. No.: 12/796,909

(22) Filed: Jun. 9, 2010

(51) Int. Cl.
 *B60R 1/00* (2006.01)
(52) U.S. Cl. ........................................... 280/768
(58) Field of Classification Search ............ 280/768; 52/169.12, 645, 649.3, 649.5, DIG. 3
See application file for complete search history.

(56) References Cited

U.S. PATENT DOCUMENTS

| | | | | |
|---|---|---|---|---|
| 2,961,255 A * | 11/1960 | Trott | ............................ | 160/23.1 |
| 3,004,769 A * | 10/1961 | Turner | .......................... | 280/768 |
| 3,042,425 A * | 7/1962 | Cathey et al. | ..................... | 52/69 |
| 3,106,411 A * | 10/1963 | Holmes | ........................ | 52/489.1 |
| 3,113,357 A * | 12/1963 | Reukauf et al. | .............. | 52/126.3 |
| 3,256,655 A * | 6/1966 | Teeter | .......................... | 52/127.5 |
| 3,722,156 A * | 3/1973 | Bryant | ....................... | 52/169.12 |
| 3,785,675 A * | 1/1974 | Norris et al. | ................... | 280/768 |
| 4,010,963 A * | 3/1977 | Prentice | ......................... | 280/768 |
| 4,043,088 A * | 8/1977 | Payton | ....................... | 52/169.12 |
| 4,107,888 A * | 8/1978 | Krueger | ..................... | 52/169.12 |
| 4,145,861 A * | 3/1979 | Yarnick | ....................... | 52/741.15 |
| 4,212,212 A * | 7/1980 | Chandler et al. | ............. | 81/57.17 |
| 4,335,548 A * | 6/1982 | Rehbein | ...................... | 52/169.11 |
| 4,549,378 A * | 10/1985 | Ayers et al. | ................. | 52/169.12 |
| 4,656,797 A * | 4/1987 | Marquart | .................... | 52/169.12 |
| 4,680,904 A * | 7/1987 | Stoecker | ..................... | 52/169.12 |
| 4,841,691 A * | 6/1989 | Stoecker | ..................... | 52/169.12 |
| 5,685,115 A * | 11/1997 | Colfer | .............................. | 52/292 |
| 6,076,327 A * | 6/2000 | Hendrickson | .............. | 52/717.05 |
| 6,125,597 A * | 10/2000 | Hoffman et al. | ........... | 52/169.12 |
| 6,205,720 B1 * | 3/2001 | Wolfrum | .................... | 52/169.12 |
| 6,536,170 B2 * | 3/2003 | Stuever | ........................... | 52/299 |
| 6,935,083 B2 * | 8/2005 | Chezum | ........................... | 52/511 |
| 7,685,781 B1 * | 3/2010 | Hatch | ........................ | 52/169.12 |
| 8,028,476 B1 * | 10/2011 | Alford | ........................... | 52/126.4 |

* cited by examiner

*Primary Examiner* — John Walters
*Assistant Examiner* — James Triggs
(74) *Attorney, Agent, or Firm* — Gulf Coast Intellectual Property Group

(57) ABSTRACT

A panel system configured to be circumferentially disposed proximate the base of a recreational camper trailer so as to environmentally isolate the area generally underneath the recreational camper trailer. The panel system is operable to assist a user maintain a temperature within the camper trailer that is different than that of its surroundings. The panel system includes a plurality of panels that are hingedly and releasably secured to each other so as to be configurable to accommodate recreational camper trailers of varying sizes. Each panel of the panel system includes a first layer and a second layer. Furthermore, each panel includes a hinge mounted on the first and second side edges that are operable to facilitate the folding of the panel system in a z-fold pattern for transportation when not in use.

4 Claims, 1 Drawing Sheet

PERIMETER PANEL SYSTEM FOR RECREATIONAL VEHICLE

FIELD OF THE INVENTION

The present invention relates to a perimeter panel system, more specifically but not by way of limitation, a panel system that includes a plurality of hingedly attached panels that function to circumferentially surround an elevated structure, such as but not limited to a recreational camper, so as to substantially eliminate access to the space intermediate the bottom of the recreational camper and the ground.

BACKGROUND

Millions of individuals participate in camping in the United States and other countries every year. Individuals engaged in camping typically utilize a variety of different forms of portable shelter to camp in at various campsites. One popular camping method is the utilization of towable camper trailers. These trailers can house individuals for extended periods of time and are popular in part due to the numerous amenities that these types of trailers provide to the user. These towable trailers are routinely transported to camping grounds or other similar facilities wherein the trailers can be operably coupled to water, electrical and sewage systems providing all the comfort of home to the user.

One problem with this type of trailer is that despite having internal environmental controls, it has been shown that controlling the internal temperature is difficult in particular environments. Many individuals that use these types of trailers in colder climates have difficulty regulating the temperature due to inefficient insulation and additionally in part as a result of the design of the trailer. Most trailers are manufactured with the floor, or bottom of the trailer, being mounted on a chassis that includes at least one axle having wheels coupled thereto. This construction causes the trailer to usually be at least several feet above the ground, which results in the external air being exposed to the bottom of the trailer. As the external air passes underneath the bottom of the trailer, it has an adverse effect on the internal temperature of the trailer in particular environments, more specifically but not by way of limitation, colder climates.

Another problem with the conventional design of the camper trailers is that the elevated design allows debris and other materials to collect underneath the trailer. The elevated design does not inhibit access to underneath the trailer to either unwanted individuals, pets or debris. The presence of any of the aforementioned can result in numerous problems for the individual utilizing the camper trailer.

Accordingly, there is a need for a panel system that circumferentially surrounds the perimeter of a conventional camper trailer that substantially extends between the bottom of the camper trailer and the ground so as to inhibit access underneath the camper trailer and provide an additional method of regulating the internal temperature of the camper trailer.

SUMMARY OF THE INVENTION

It is the object of the present invention to provide a perimeter panel system that circumferentially surrounds a conventional camper trailer and extends vertically from the ground to at least the bottom of the camper trailer.

Another object of the present invention is to provide a perimeter panel system that circumferentially surrounds the base of a camper trailer that utilizes a plurality of releasably secured and interconnected panels to accommodate numerous different sizes of trailers.

Still another object of the present invention is to provide a perimeter panel system that circumferentially surrounds the base of a camper trailer that includes at least one panel having an aperture configured to allow a utility connection therethrough.

An additional object of the present invention is to provide a perimeter panel system that circumferentially surrounds the base of a camper trailer that includes at least one panel that is formed to accommodate a step or other entry structure that is part of the camper trailer.

A further object of the present invention is to provide a perimeter panel system that circumferentially surrounds the base of a camper trailer that is manufactured from an insulating material so as to assist in the regulation of the internal temperature of the camper trailer to a temperature that is dissimilar from the external environment.

Still another object of the present invention is to provide a perimeter panel system that circumferentially surrounds the base of a conventional camper trailer that is foldable in a z-fold configuration.

An additional object of the present invention is to provide a perimeter panel system that circumferentially surrounds the base of a convention camper trailer that is lightweight and easy to assemble.

To the accomplishment of the above and related objects the present invention may be embodied in the form illustrated in the accompanying drawings. Attention is called to the fact that the drawings are illustrative only.

Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
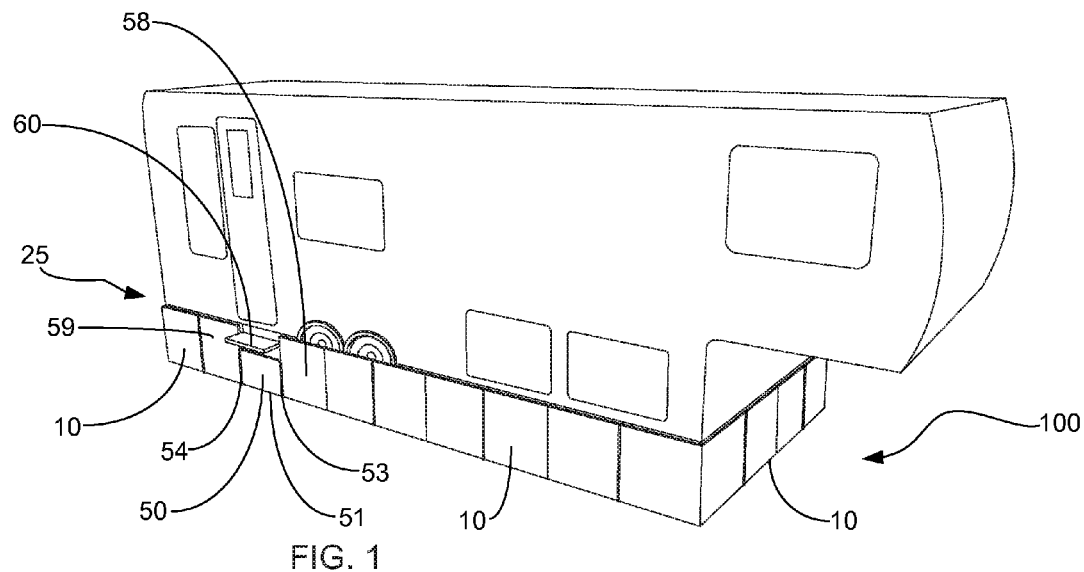
FIG. 1 is a perspective view of an embodiment of the invention circumferentially surrounding a camper trailer wherein one panel is formed to accommodate a step integral to the camper.

Referring now to the drawings submitted herewith, wherein various elements depicted therein are not necessarily drawn to scale and wherein through the views and figures like elements are referenced with identical reference numerals, there is illustrated a panel system 100 constructed according to the principles of the present invention.

The panel system 100 further includes a plurality of panels 10 that are generally square in shape and are manufactured of a suitable durable material. While no particular material is required, good results have been achieved utilizing a panel 10 that includes an exterior surface 11 constructed of vinyl and an inner core (not illustrated herein) that is constructed of a lightweight insulating material, such as but not limited to a high density polyethylene fibrous material. It is contemplated within the scope of the present invention that the panels 10 are constructed so as to have an exterior surface 11 resistant to damage while providing thermal isolation for the area contained within the panel system 100 generally underneath the conventional camper trailer 5.

The panels 10 include a top edge 15, bottom edge 20 and two opposing side edges 30, 35. While no particular dimensions of the panel 10 are required, it is contemplated within the scope of the present invention that the height of the panel as measured from the bottom edge 20 to the top edge 15 is greater than the height of the base 7 from the ground on which the conventional camper trailer 5 is superposed. More specifically but not by way of limitation, good results have been achieved with a panel 10 that is approximately thirty inches in height as measured from the top edge 15 to the bottom edge 20. Additionally, while no specific width of the panel 10 is required as measured intermediate each opposing sides 30,35, good results have been with a panel 10 that is approximately thirty inches in width as measured between the opposing sides 30, 35 of a panel 10. The top edge 15 of each panel 10 is generally proximate the base 7 subsequent the panel system 100 being placed in position wherein the panel system 100 circumferentially surrounds the conventional camper trailer 100. Additionally, the panel system 100 is in a generally vertical orientation subsequent its installment circumferentially around the conventional camper trailer 5.

The panels 10 are hingedly coupled proximate each of the opposing sides 30,35 of each adjacent panel 10 in order to comprise the panel system 100 that circumferentially surrounds a conventional camper trailer 5. The panels 10 are combined to form the panel system 100 that functions to thermally and environmentally isolate the area underneath the conventional camper trailer 5. The panel system 100 thermally and environmentally isolates the area underneath the conventional camper trailer 5 so as to assist in the control of the regulation of the internal temperature of the conventional camper trailer 5, wherein the occupant of the conventional camper trailer 5 desires to maintain a temperature within the interior of the conventional camper trailer 5 that is dissimilar to that of its environment. More specifically but not by way of limitation, the panels 10 function to substantially eliminate air flow underneath the base 7 of the conventional camper trailer 5 thereby providing environmental isolation of the area underneath the conventional camper trailer 5 by substantially surrounding the perimeter 6 of the base 7 of the conventional camper trailer 5. The substantial elimination of air flow underneath the conventional camper trailer 5 significantly increases the ability of the occupant of the conventional camper trailer 5 to regulate the internal temperature of the conventional camper trailer 5 and maintain a temperature that is dissimilar to that of its surroundings.

The panels 10 further include a hinge 40 mounted along each opposing side 30,35. The hinge 40 is a conventional piano-style hinge that is substantially the length of each opposing side 30, 35 and functions to facilitate the folding of the panel system 100 for transportation. More specifically, the hinge 40 allows for one hundred and eighty degree movement of each panel relative to the adjacent panel 10 so as to permit the panel system 100 to be folded in a z-fold pattern wherein each panel 10 is superposed the adjacent and joining panel 10 so as to form one stack for easier manipulation for transport. Those skilled in the art will recognize that numerous suitable mechanical fasteners could be implemented to hingedly couple the panels 10 to each other in order to facilitate the folding of the panel system 100 in a z-fold pattern. The hinge 40 further functions to facilitate through suitable mechanical methods the removable connection between each panel 10.

Each panel 10 of the panel system 100 is further removably connected to the adjacent panel 10 so as to facilitate the appropriate sizing of the panel system 100 in order for the panel system 100 to be appropriately sized to substantially surround the perimeter 6 of conventional camper trailer 5. Those skilled in the art will recognize that numerous keepers could be utilized to facilitate the removable fastening of each panel 10, more specifically but not by way of limitation a hinge pin could be utilized to permit each panel 10 to be removably connected to an adjacent panel 10.

As shown in particular in FIG. 1, a step panel 50 is included in the panel system 100. The step panel 50 is manufactured in accordance with the principles of the panels 10 having a vinyl exterior surface 51 and a core of high density polyethylene fibrous material. The step panel 51 includes hinges 40 along each opposing side 53, 54 so as to be hingedly secured to adjacent panels 58, 59. The step panel 50, is further configured to be removably mounted to adjacent panels 58, 59 similarly to the other panels 10 that comprise the panel system 100. The step panel 50 is configured to have a height that is less than the panels 10 in the panel system 100. More specifically but not by way of limitation, the step panel 50 is of suitable height to be at least slightly below a step 60 of the conventional camper trailer 5. The step panel 50 allows the user to assemble the panel system 100 to circumferentially surround the base 7 of the conventional camper trailer 5 and not interfere with the normal operation of the step 60. While only one step panel 50 is illustrated herein, it is contemplated within the scope of the present invention that more than one step panel 100 could be included as part of the panel system 100.

A utilities panel 70 is further included in the panel system 100. The utilities panel 70 is manufactured in accordance with the principles of the panels 10 having a vinyl exterior surface 71 and a core of high density polyethylene fibrous material. The utilities panel 70 includes hinges 40 along each opposing side 73, 74 so as to be hingedly secured to adjacent panels 78, 79. The utilities panel 70 is approximately the same size as the panels 10 and further includes an aperture 80. The aperture 80 functions to accommodate therethrough utilities connections, such as but not limited to drain pipes, so as to allow the panel system 100 to be circumferentially surround the base 7 of the conventional camper trailer 5 without interference from the standard utilities connections that routinely are operably coupled to a conventional camper trailer 5 when in use. While only one utilities panel 70 is illustrated herein, it is contemplated within the scope of the present invention that more than one utilities panel 100 could be included as part of the panel system 100.

While the panel system 100 in its preferred embodiment is designed to circumferentially surround a conventional camper trailer 5 so as to environmentally and thermally isolate the area underneath, it is further contemplated within the scope of the present invention that the panel system 100 could be configured to circumferentially surround any elevated structure so as to environmentally and thermally isolate the area underneath the structure. More specifically but not by way of limitation, the panel system 100 could be configured to circumferentially surround a traditional pier and beam style house, mobile home or travel trailer. Furthermore, it is contemplated within the scope of the present invention that the panel system 100 could include at least one panel having a plurality of apertures so as to allow occupants of the conventional camper trailer 5 to house small animals underneath the conventional camper trailer 5 without substantially comprising the environmental and thermal isolation provided by the panel system 100.

Figure 2:
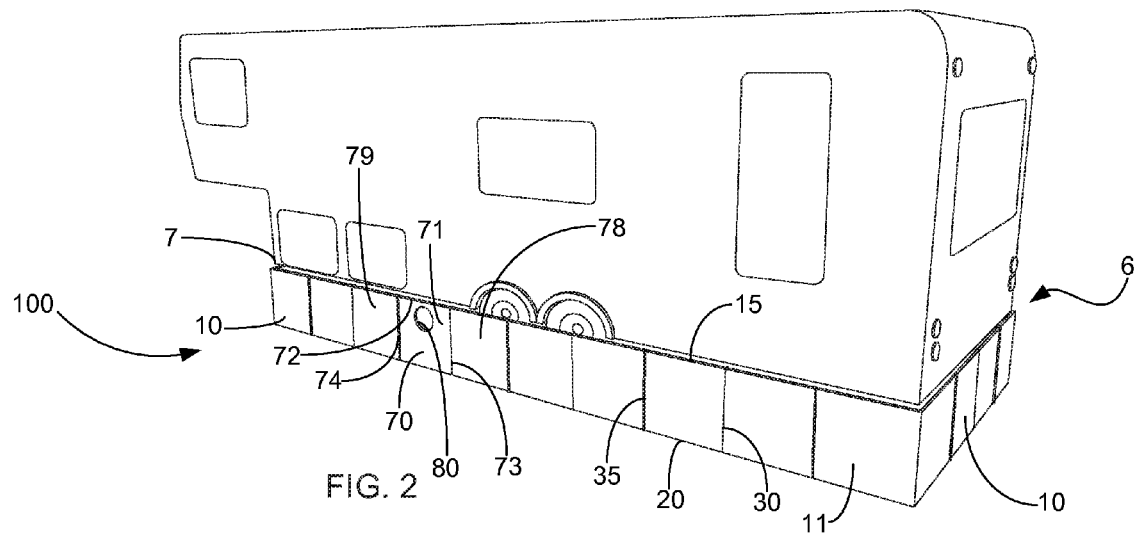
FIG. 2 is a perspective view of an embodiment of the invention circumferentially surrounding a camper trailer wherein one panel is formed to accommodate a utilities pipe.
Figure 3:
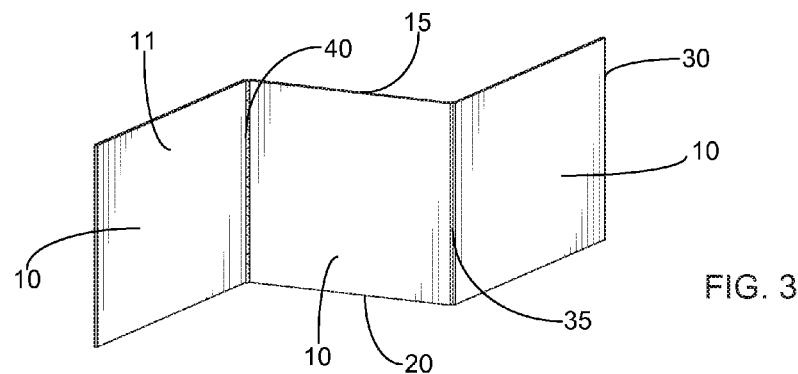
FIG. 3 is a top perspective view of a portion of an embodiment of the present invention.

Referring in particular to FIGS. 1 and 2, a description of the operation of the panel system 100 is as follows. The user will assemble a plurality of panels 10 utilizing the hinge 40 so as to form a panel system 100 that is of appropriate length to circumferentially surround the perimeter 6 of a conventional camper trailer 5. The step panel 50 is positioned in the appropriate location so as to be generally underneath the step 60 and substantially not interfere with the normal operation thereof. Additionally, the utilities panel 70 is positioned within the panel system 100 so as to allow the user to journal the necessary utility connection therethrough without interfering with the normal operation of the utilities and further allowing the utility panel 70 to be generally adjacent the base 7 proximate the top edge 72. The panel system 100 is deployed so as to circumferentially surround the conventional camper trailer 5 upon the user locating the conventional camper trailer in a desired location. While not illustrated herein, it is contemplated within the scope of the present invention that the panel system 100 could be releasably secured proximate the base 7 utilizing conventional fasteners such as but not limited to snaps or hook and loop fasteners. When the user desires to relocate the conventional camper trailer 5, the user will fold the panels 10 comprising the panel system in a z-fold pattern so as to facilitate the transportation thereof. It is further contemplated within the scope of the present invention that the panel system 100 may be divided into two approximately equivalent halves that are joined together so as to enable a user to more easily deploy and remove the panel system 100.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A panel system configured to be surroundably disposed proximate a recreational camper trailer on a chassis having wheels being elevated above the ground comprising:

a plurality of panels, said plurality of panels operably connected so as to circumferentially surround the recreational camper trailer, said plurality of panels functioning to maintain a temperature that is different than that of its surroundings for the area underneath the recreational camper trailer, said plurality of panels being generally square in shape, said plurality of panels having a top edge and a bottom edge, said plurality of panels having a first side edge and a second side edge, said plurality of panels being positioned in a vertical orientation adjacent the recreational camper trailer;

a utilities panel, said utilities panel having an aperture, said aperture being generally round in shape, said aperture being of sufficient size to accommodate a drain pipe journaled therethrough;

at least one step panel, said step panel having a distance between said top edge and said bottom edge that is less that that of all of the panels of said plurality of panels, said step panel operable to accommodate a step integrated into the recreational camper trailer; and wherein each of the panels of said plurality of panels have a first layer and a second layer, the distance between said bottom edge and said top edge of said plurality of panels is greater than the distance between the bottom of the recreational camper and the ground on which the recreational camper is superposed.

2. The panel system as recited in claim 1, and further including a plurality of hinges, said plurality of hinges being mounted along said first side edge and said second side edge of each panel of said plurality of panels, said plurality of hinges extending substantially the length of said first side and said second side, said plurality of hinges operable to facilitate the movement of each panel of said plurality of panels approximately one hundred and eighty degrees with respect to each other.

3. The panel system as recited in claim 2, wherein said first layer of each panel of said plurality of panels being manufactured from vinyl and said second layer of each panel of said plurality of panels being manufactured from a high density polyethylene fibrous material.

4. The panel system as recited in claim 3, wherein said plurality of hinges are operable to facilitate said plurality of panels to be folded in a z-fold pattern when said plurality of panels are not in use proximate a recreational camper trailer.

* * * * *